(12) United States Patent
Massler

(10) Patent No.: US 10,969,154 B1
(45) Date of Patent: Apr. 6, 2021

(54) ILLUMINATING INSTANT COLD PACK

(71) Applicant: Joshua Mathew Massler, Roseland, NJ (US)

(72) Inventor: Joshua Mathew Massler, Roseland, NJ (US)

(*) Notice: Subject to any disclaimer, the term of this patent is extended or adjusted under 35 U.S.C. 154(b) by 0 days.

(21) Appl. No.: 17/097,846

(22) Filed: Nov. 13, 2020

(51) Int. Cl.
| | |
|---|---|
| *F25D 5/00* | (2006.01) |
| *F25D 5/02* | (2006.01) |
| *F21K 2/06* | (2006.01) |
| *C09K 5/18* | (2006.01) |
| *F25D 27/00* | (2006.01) |
| *F21V 21/08* | (2006.01) |

(52) U.S. Cl.
CPC ............. *F25D 5/02* (2013.01); *C09K 5/18* (2013.01); *F21K 2/06* (2013.01); *F21V 21/0808* (2013.01); *F21V 21/0832* (2013.01); *F25D 27/00* (2013.01)

(58) Field of Classification Search
CPC ... F25D 5/00; F25D 5/02; F25D 27/00; F21K 2/04
See application file for complete search history.

(56) References Cited

U.S. PATENT DOCUMENTS

2015/0040585 A1* 2/2015 Pologe .................. F25D 5/02 62/4

* cited by examiner

*Primary Examiner* — Brian M King
(74) *Attorney, Agent, or Firm* — Kelley Drye & Warren LLP

(57) ABSTRACT

A portable device for cooling a container, such as a beverage, while providing a source of illumination. The portable device may have one or more inner packets containing one or more chemicals, within an outer packet containing one or more chemicals, whereby breaching the one or more inner packets causes the contents of the one or more inner packets to combine with the contents of the outer packet, resulting in one or more chemical reactions that lower the temperature of the outer surface of the outer packet and generate light.

20 Claims, 11 Drawing Sheets

US 10,969,154 B1

ILLUMINATING INSTANT COLD PACK

BACKGROUND OF THE INVENTION

Instant cold packs are often used to treat injuries or sore muscles. An instant cold pack typically consists of two packets or bags: a first packet containing water, inside a second packet containing a solid chemical such as ammonium nitrate or calcium ammonium nitrate. When the inner packet of water is broken by squeezing the package, it dissolves the solid chemical in an endothermic reaction. The resulting reaction absorbs heat from the surroundings, quickly lowering the temperature of the inner surface of the second packet. Instant cold packs may be carried as first aid to remote or wilderness areas where ice is unavailable.

Light sticks are self-contained, short-term light-sources. They are often used for recreation, and to provide light for military, police, fire, or emergency medical services operations. Light sticks typically consist of two vessels: an inner packet containing a first chemical, inside an outer translucent plastic tube containing a second chemical or solution of chemicals. The inner packet may contain a chemical such as hydrogen peroxide. The chemicals inside the plastic tube may be a mixture of dye, a base catalyst such as sodium salicylate, and diphenyl oxalate. The outer plastic tube may be flexed, causing the inner vessel to break and allowing the contents of the inner packet and outer plastic tube to combine. When the contents combine, they generate light by chemiluminescence, without the need for an external energy source. The reaction releases energy mostly as light, with very little heat.

Although instant cold packs and light sticks have been commercially available for years, they have not been combined in a manner according to the present invention disclosed herein.

SUMMARY OF THE INVENTION

The present invention is directed to a portable device for cooling a container, such as a beverage, while providing a source of illumination.

It is an object of the present invention to provide a portable device having one or more inner packets containing one or more inner chemicals, within an outer packet that is at least partly translucent and contains one or more chemicals, wherein breaching the one or more inner packets causes the contents of the one or more inner packets to combine with the contents of the outer packet, resulting in one or more chemical reactions that lower the temperature of the inner surface of the outer packet and generate light.

Numerous variations may be practiced in the preferred embodiment.

BRIEF DESCRIPTION OF THE DRAWINGS

A further understanding of the invention can be obtained by reference to exemplary embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description. Like reference numbers generally refer to like features (e.g., functionally similar and/or structurally similar elements).

The drawings are not necessarily depicted to scale; in some instances, various aspects of the subject matter disclosed herein may be shown exaggerated or enlarged in the drawings to facilitate an understanding of different features. Also, the drawings are not intended to limit the scope of this invention, which is set forth with particularity in the claims as appended hereto or as subsequently amended, but merely to clarify and exemplify the invention.

DETAILED DESCRIPTION OF THE INVENTION

The invention may be understood more readily by reference to the following detailed descriptions of embodiments of the invention. However, techniques, systems, and operating structures in accordance with the invention may be embodied in a wide variety of forms and modes, some of which may be quite different from those in the disclosed embodiments. Also, the features and elements disclosed herein may be combined to form various combinations without exclusivity, unless expressly stated otherwise. Consequently, the specific structural and functional details disclosed herein are merely representative. Yet, in that regard, they are deemed to afford the best embodiments for purposes of disclosure and to provide a basis for the claims herein, which define the scope of the invention. It should also be noted that, as used in the specification and the appended claims, the singular forms "a", "an", and "the" include plural referents unless the context clearly indicates otherwise.

Use of the term "exemplary" means illustrative or by way of example, and any reference herein to "the invention" is not intended to restrict or limit the invention to the exact features or steps of any one or more of the exemplary embodiments disclosed in the present specification. Also, repeated use of the phrase "in one embodiment," "in an exemplary embodiment," or similar phrases do not necessarily refer to the same embodiment, although they may. It is also noted that terms like "preferably," "commonly," and "typically," are not used herein to limit the scope of the claimed invention or to imply that certain features are critical, essential, or even important to the structure or function of the claimed invention. Rather, those terms are merely intended to highlight alternative or additional features that may or may not be used in a particular embodiment of the present invention.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described.

Figure 1:
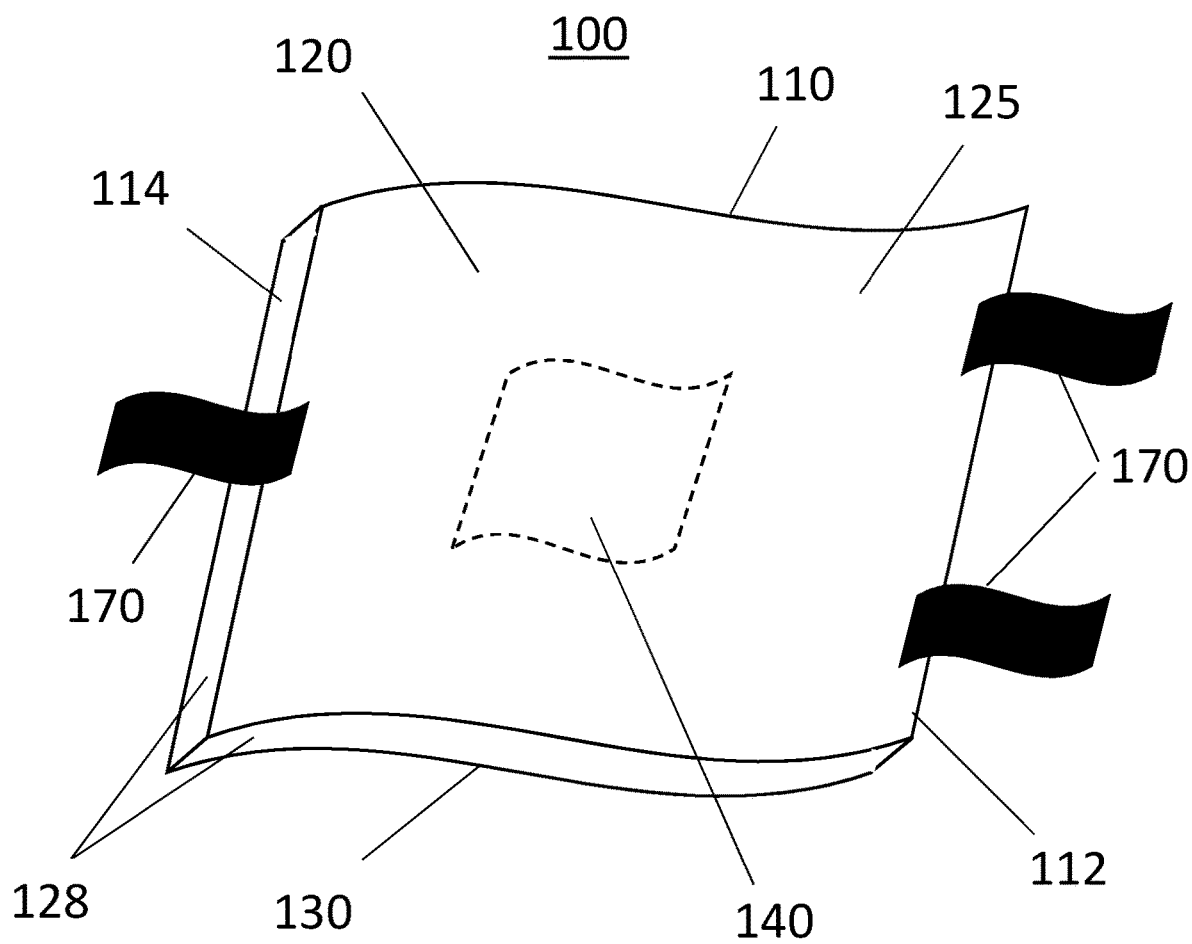
FIG. 1 depicts an exemplary device in accordance with the present of the invention.

FIG. 1 depicts a device (100) in accordance with the present invention. Device (100) includes an outer packet (110) extending from a first end (112) to a second end (114). Outer packet (110) may be formed from an outer wall (120) and an inner wall (130) with an inner chamber (125) between outer wall (110) and inner wall (120). The size and shape of outer wall (120) (e.g., a rectangle) may be the same size and shape as inner wall (130). Inner chamber (125) may be formed by joining each outer edge of outer wall (120) to each outer edge of inner wall (130). Alternatively, one or more walls (128) may be used to join each outer edge of outer wall (120) to each outer edge of inner wall (130). Inner chamber (125) is preferably water tight so that no liquid therein may pass outside packet (110).

Outer wall (120) and/or inner wall (130) may be formed from a flexible material such as plastic or neoprene. Outer wall (120) may be made from and/or include one or more layers of insulating material. Additionally or alternatively, at least part of outer wall (120) may be translucent. An inner packet (140) may be located within outer packet (110). Inner packet (140) is preferably formed from, for example, plastic.

Outer packet (110) and inner packet (140) may each contain a chemical (or set of chemicals) that, when combined, are known to cause an endothermic reaction resulting in a solution, for example, having a temperature below fifty degrees Fahrenheit that is capable of cooling inner wall (130). For example, contained within outer packet (110) may be ammonium nitrate and/or calcium ammonium nitrate, and contained within inner packet (140) may be water. Alternatively, contained within outer packet (110) may be water and contained within inner packet (140) may be ammonium nitrate and/or calcium ammonium nitrate.

Additionally or alternatively, outer packet (110) and inner packet (140) may each contain a chemical (or set of chemicals) that, when combined, are known to generate light by chemoluminescence. For example, contained within outer packet (110) may be a mixture of dye, a base catalyst such as sodium salicylate, and diphenyl oxalate, and contained within inner packet (140) may be hydrogen peroxide. Alternatively, contained within outer packet (110) may be hydrogen peroxide and contained within inner packet (140) may be a mixture of dye, a base catalyst such as sodium salicylate, and diphenyl oxalate.

Descriptions herein of chemicals "contained" within outer packet (110) are not meant to be read as contained within inner packet (140), even though inner packet (140) is located within outer packet (110). Chemicals described as contained within outer packet (110) are located outside inner packet (140) unless and until inner packet (140) is broken as described below.

Device (100) may further include one or more joining elements that may be used to join or releasably connect first end (112) to second end (114) of outer packet (110) together. For example, device (100) may have one or more strips (170) attached to and/or near first end (112) and second end (114). An adhesive may be applied to all or a portion of one side of each strip. A protective liner (not shown) may be used to cover the adhesive during transport and until device (100) is ready to be used.

To activate device (100), a user of the device may squeeze or twist outer packet (110) until inner packet (140) breaks. The user may shake the device (100) to ensure the contents of inner packet (140) fully mix with the contents of outer packet (110).

Figure 2:
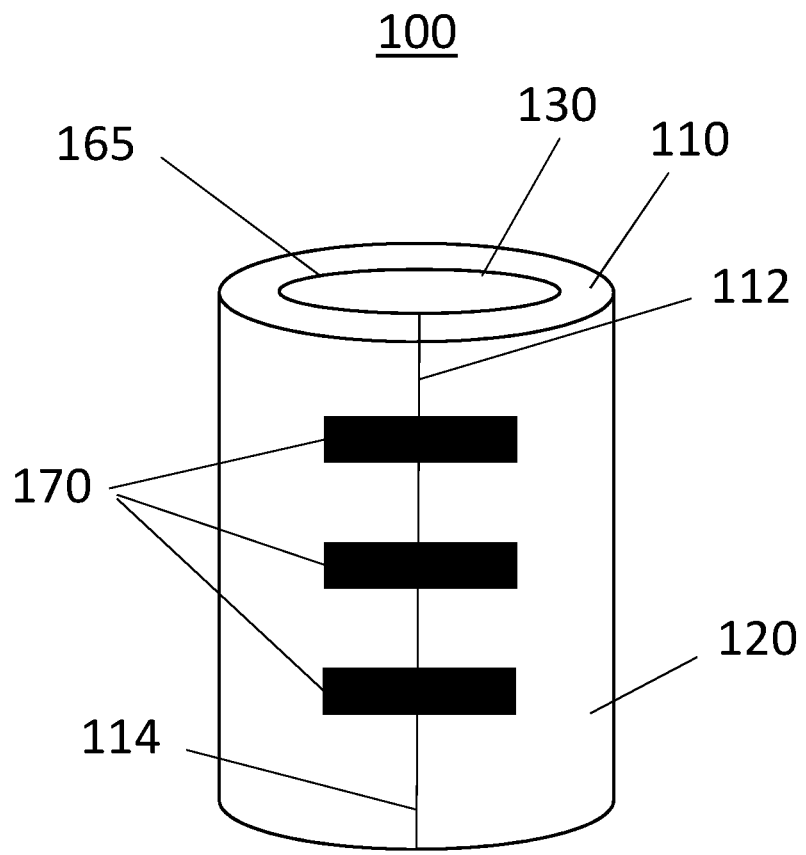
FIG. 2 depicts an alternate view of the device depicted in FIG. 1.

The user may then apply device (100) to a container or other object to be cooled. As shown in FIG. 2, first end (112) and second end (114) of outer packet (110) may be joined to form a cylinder. Strips (170) having an adhesive applied thereon may be used to join first end (112) and second end (114). To the extent that a protective liner is used to cover each adhesive, prior to use, the protective liner may be removed (e.g., peeled off the adhesive) to expose the adhesive. The adhesive on each strip (170) attached to first end (112) may then be applied to or near second end (114) of first packet (110) (or vice versa), so that that each strip (170) helps hold outer packet (110) in the form of a cylinder. A user may wrap outer packet (110) around a container or other object, or may form outer packet (110) into a cylinder and then insert a container or other object to through the aperture (165) formed at one end of the cylinder.

Figure 3:
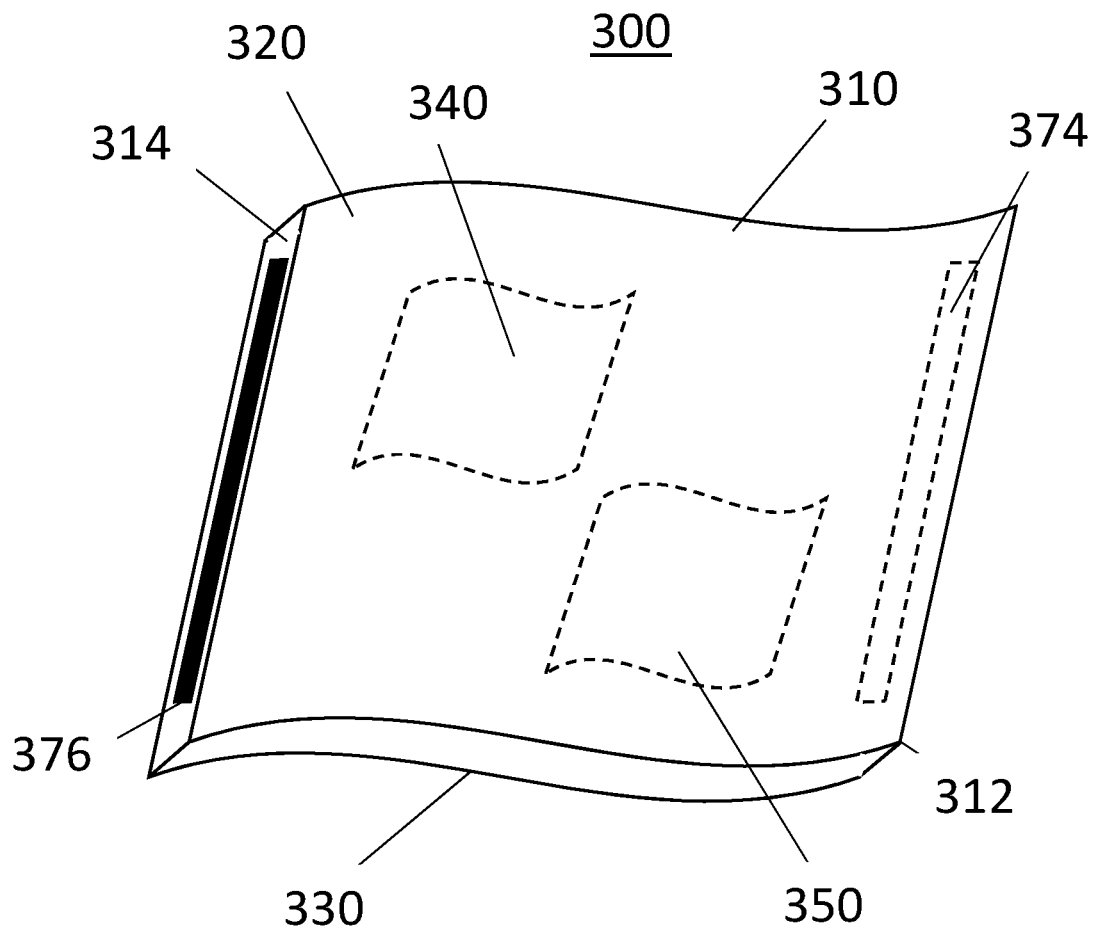
FIG. 3 depicts an exemplary device in accordance with the present of the invention.

FIG. 3 depicts an alternative embodiment of a device (300) in accordance with the present invention. Device (300) includes an outer packet (310) extending from a first end (312) to a second end (314). Outer packet (310) may be formed from an outer wall (320) and an inner wall (330), similar to the construction described above for outer packer (110) depicted in FIG. 1. Outer wall (320) and/or inner wall (330) may be formed from a flexible material such as plastic or neoprene. Outer wall (320) may be made from and/or include one or more layers of insulating material. Additionally or alternatively, at least part of outer wall (320) may be translucent.

A first inner packet (340) and a second inner packet (350) may be located within outer packet (310). First and second inner packets (340, 350) are preferably formed from, for example, plastic.

Outer packet (310) and inner packets (340, 350) may each contain a chemical (or set of chemicals) that, when combined, are known to cause an endothermic reaction as described above. Additionally or alternatively, outer packet (310) and inner packets (340, 350) may each contain a chemical (or set of chemicals) that, when combined, are known to generate light by chemoluminescence as described above. Descriptions herein of chemicals "contained" within outer packet (310) are not meant to be read as contained within inner packets (340, 350), even though inner packets (340, 350) are located within outer packet (310). Chemicals described as contained within outer packet (310) are located outside inner packets (340, 350) unless and until inner packets (340, 350) are broken as described below.

Inner packets (340, 350) may each contain the same chemical or chemicals, or inner packets (340, 350) may each contain different chemicals. For example, outer packet (310) may contain a chemical (or set of chemicals) known to cause an endothermic reaction when combined with the chemical (or set of chemicals) contained in first inner packet (340), and outer packet (310) may further contain a chemical (or set of chemicals) known to generate light by chemoluminescence when combined with a chemical (or set of chemicals) contained in second inner packet (350). Alternatively, inner packets (340, 350) may contain the same chemicals. For example, outer packet (310) may contain a chemical (or set of chemicals) known to cause an endothermic reaction when combined with the chemical (or set of chemicals) contained in inner packets (340, 350), and outer packet (310) may further contain a chemical (or set of chemicals) known to generate light by chemoluminescence when combined with a chemical (or set of chemicals) further contained in inner packets (340, 350).

Device (300) may further include one or more joining elements that may be used to join or releasably connect first end (312) to second end (314) of outer packet (310). For example, device (300) may include complementary strips (374, 376) of hook-and-loop material (i.e., Velcro) at or near first end (312) and second end (314) of outer packet (310), respectively.

To activate device (300), a user of the device may squeeze or twist outer packet (310) until first inner packet (340) and/or second inner packer (350) breaks. The user may shake the device (300) to ensure the contents of inner packets (340, 350) fully mix with the contents of outer packet (310).

Figure 4:
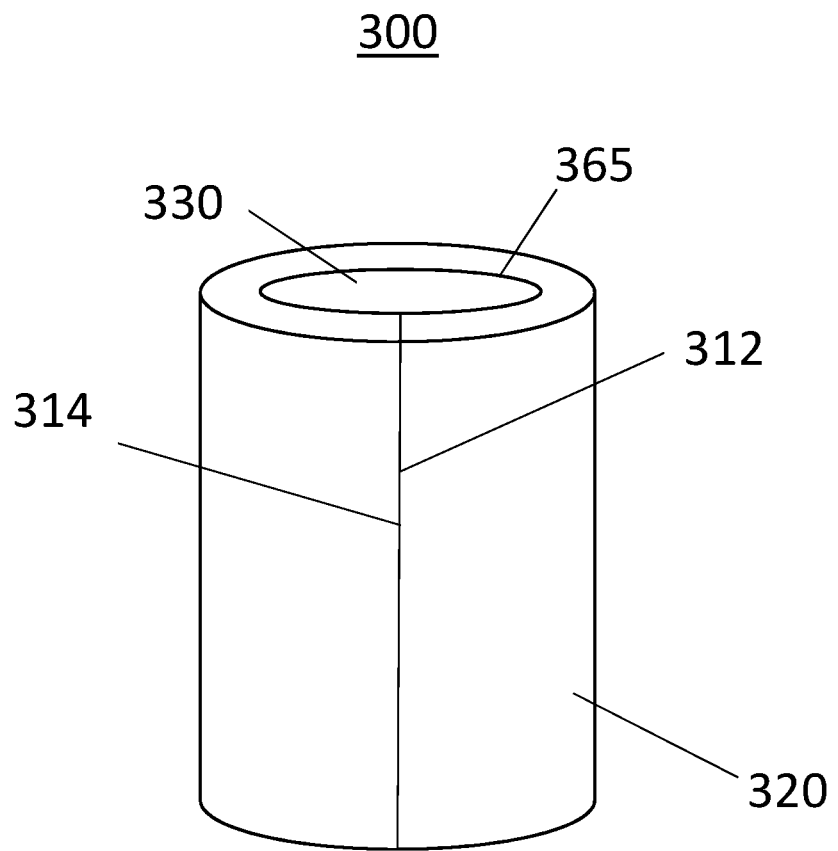
FIG. 4 depicts an alternate view of the device depicted in FIG. 3.

The user may then apply device (300) to a container or other object to be cooled. As shown in FIG. 4, first end (312) and second end (314) of outer packet (310) may be joined to form a cylinder. Complementary strips (374, 376) of hook-and-loop material (i.e., Velcro) at or near first end (312) and second end (314) of outer packet (310) may help hold outer packet (310) in the form of a cylinder. A user may wrap outer packet (310) around a container or other object, or may form outer packet (310) into a cylinder and then insert a container or other object through the aperture (365) formed at one end of the cylinder.

Figure 5:
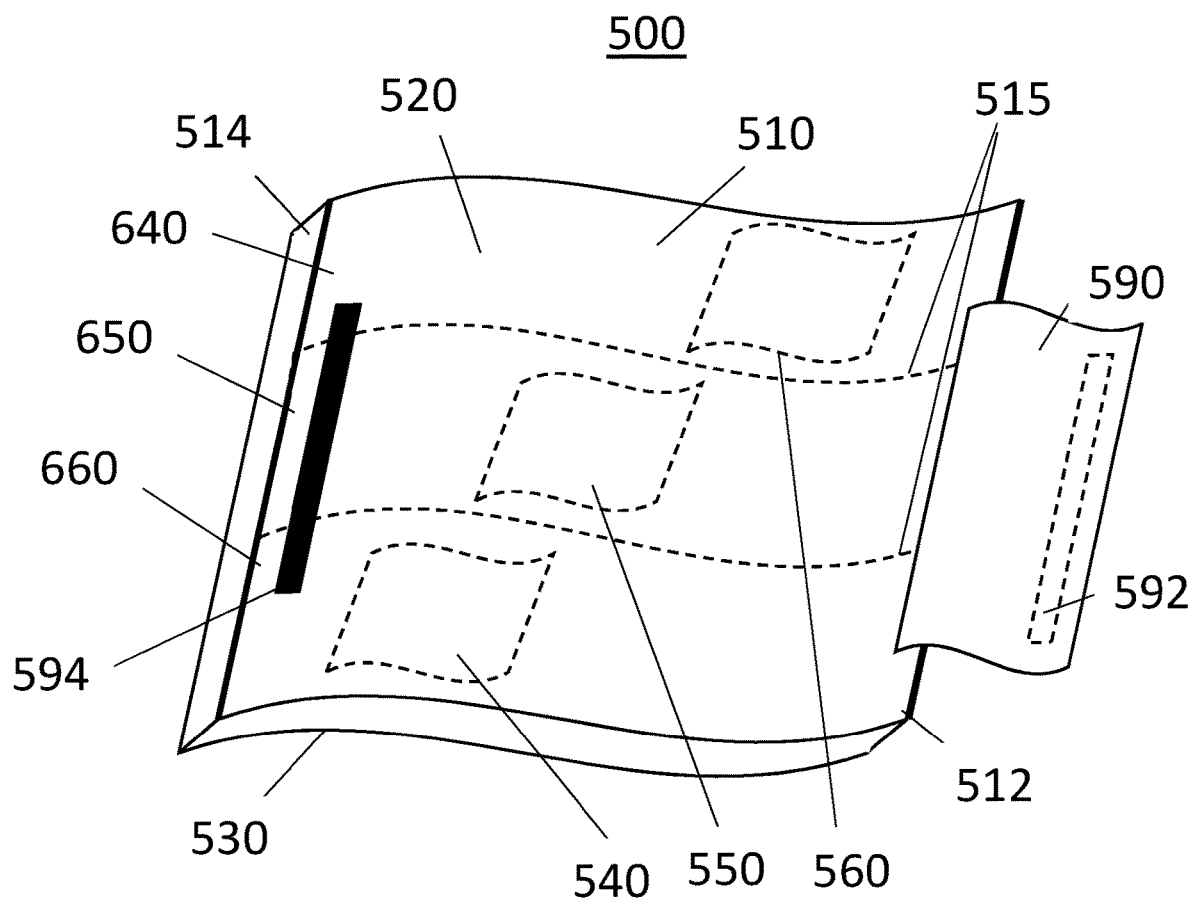
FIG. 5 depicts an exemplary device in accordance with the present of the invention.

FIG. 5 depicts an alternative embodiment of a device (500) in accordance with the present invention. Device (500) includes an outer packet (510) extending from a first end (512) to a second end (514). Outer packet (510) may be formed from an outer wall (520) and an inner wall (530), similar to the construction described above for outer packer (110) depicted in FIG. 1. Outer wall (520) and/or inner wall (530) may be formed from a flexible material such as plastic or neoprene. Outer wall (520) may be made from and/or include one or more layers of insulating material. Additionally or alternatively, at least part of outer wall (120) may be translucent.

A plurality of inner packets (540, 550, 560) may be located within outer packet (510). One or more interior walls or dividers (515) may separate the space within outer packet (510) into separate chambers (640, 650, 660). One or more inner packets (540, 550, 560) may be located within each inner chamber (640, 650, 660). Each inner packet (540, 550, 560) is preferably formed from, for example, plastic.

Each inner chamber (640, 650, 660) and the one or more inner packets (540, 550 560) located therein may each contain a chemical (or set of chemicals) that, when combined, are known to cause an endothermic reaction as described above. Additionally or alternatively, each inner chamber (640, 650, 660) and the one or more inner packets (540, 550, 560) located therein may each contain a chemical (or set of chemicals) that, when combined, are known to generate light by chemoluminescence as described above.

Descriptions herein of chemicals "contained" within outer packet (510) or within inner chambers (640, 650, 660) are not meant to be read as contained within inner packets (540, 550, 560), even though inner packets (540, 550, 560) are located within outer packet (510) and/or inner chambers (640, 650, 660). Chemicals described as contained within outer packet (510) or inner chambers (640, 650, 660) are located outside inner packets (540, 550, 560) unless and until inner packets (540, 550, 560) are broken as described below.

Each inner packet (540, 550, 560) may contain the same chemical or chemicals, or each inner packet (540, 550, 560) may contain different chemicals. For example, inner chambers (640, 660) may contain a chemical (or set of chemicals) known to cause an endothermic reaction when combined with the chemical (or set of chemicals) contained in inner packets (540, 560), whereas inner chamber (650) may contain a chemical (or set of chemicals) known to generate light by chemoluminescence when combined with a chemical (or set of chemicals) contained in inner packet (550). Also, each inner packet (540, 550, 560) may contain a dye, and the dyes may be the same color in each packet (540, 550, 560) or different colors.

Device (500) may further include one or more joining elements that may be used to join or releasably connect first end (512) to second end (514) of outer packet (510). For example, device (500) may include one or more strips (590) attached at or near first end (512) of outer packet (510). Each strip (590) may have hook-and-loop material (i.e., Velcro) (592) applied thereon that may be attached to a complementary portion of hook-and-loop material (594) at or near second end (512) of outer packet (510). All or a portion of outer wall (512) may be covered in hook-and-loop material.

To activate device (500), a user of the device may squeeze or twist outer packet (510) until one or more of inner packets (540, 550, 560) breaks. The user may shake the device (500) to ensure the contents of one or more of the inner packets (540, 550, 560) fully mixes with the contents of the inner chamber (640, 650, 660) in which each inner packet (540, 550, 560) is located.

Figure 6:
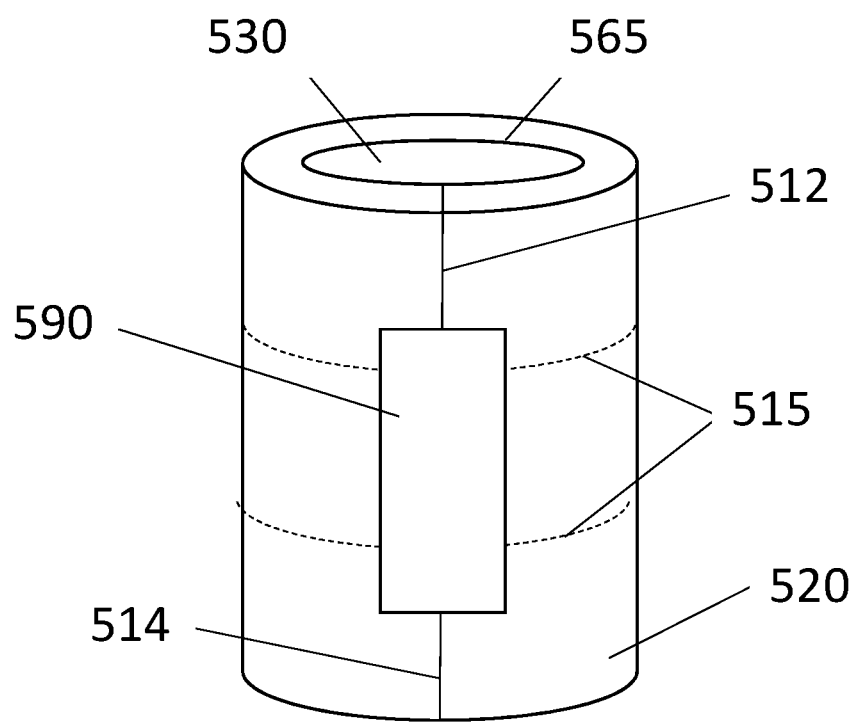
FIG. 6 depicts an alternate view of the device depicted in FIG. 5.

The user may then apply device (500) to a container or other object to be cooled. As shown in FIG. 6, first end (512) and second end (514) of outer packet (510) may be joined to form a cylinder. By joining the hook-and-loop material (592) on strip (590) with a complementary portion of hook and loop material (594) on outer wall (520), strip (590) may hold outer packet (510) in the form of a cylinder. A user may wrap outer packet (510) around a container or other object, or may form outer packet (510) into a cylinder and then insert a container or other object through the aperture (565) formed at one end of the cylinder.

Figure 7A:
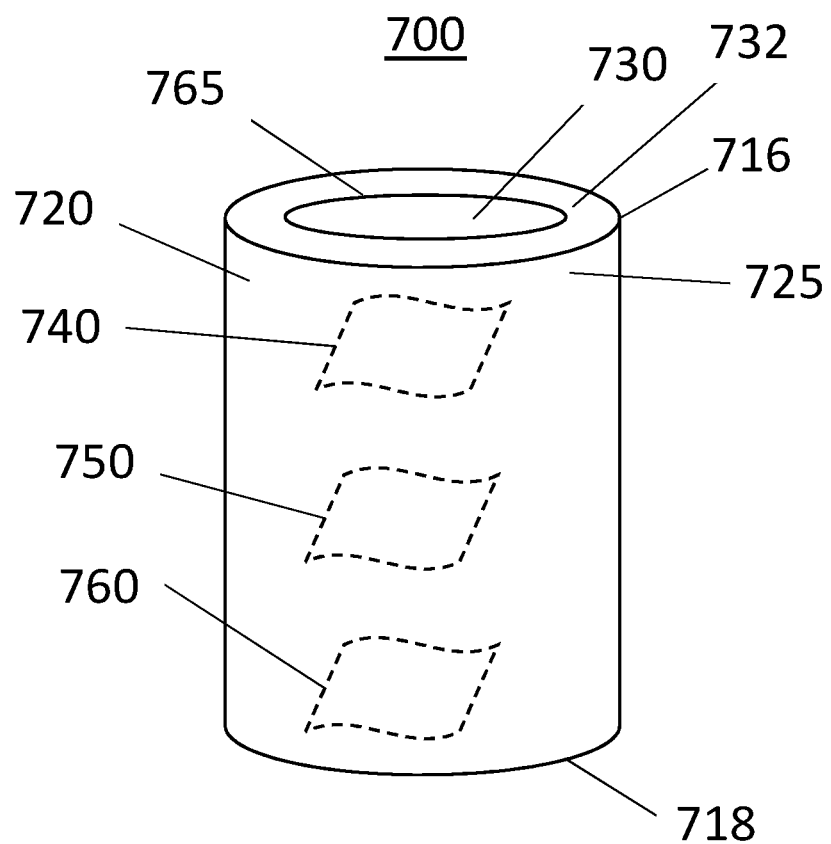
FIG. 7A depicts an exemplary device in accordance with the present of the invention.

FIG. 7A depicts an alternative embodiment of a device (700) in accordance with the present invention. Device (700) is in the form of a cylinder extending from a top end (716) to a bottom end (718). Device (700) may include a cylindrical outer wall (720), a cylindrical inner wall (730), and a cylindrical inner chamber (725) between outer wall (720) and inner wall (730). A top wall (732) and a bottom wall (not shown) may connect outer wall (720) to inner wall (730). Cylindrical inner chamber (725) is preferably water tight so that no liquid therein may pass outside device (700).

Device (700) includes a circular aperture (765) at the top end (716). Device (700) may further include an aperture (not shown) at the bottom end (718). The aperture at the bottom end (718) may be a circular aperture—having a radius that is the same radius as or a different radius than aperture (765)—or an aperture of a different shape. Alternatively, bottom end (718) may be fully enclosed by a floor (not shown).

Outer wall (720) and/or inner wall (730) may be formed from a flexible material such as plastic or neoprene. Outer wall (720) may be made from and/or include one or more layers of insulating material. Additionally or alternatively, at least part of outer wall (720) may be translucent.

One or more inner packets (740, 750, 760) may be located within inner chamber (725). The one or more inner packets (740, 750, 760) are preferably formed from, for example, plastic.

Inner chamber (725) and one or more inner packets (740, 750, 760) may each contain a chemical (or set of chemicals) that, when combined, are known to cause an endothermic reaction as described above. Additionally or alternatively, inner chamber (725) and one or more inner packets (740, 750, 760) may each contain a chemical (or set of chemicals) that, when combined, are known to generate light by chemoluminescence as described above.

Descriptions herein of chemicals "contained" within inner chamber (725) are not meant to be read as contained within inner packets (740, 750, 760), even though inner packets (740, 750, 760) are located within inner chamber (725). Chemicals described as contained within inner chamber (725) are located outside inner packets (740, 750, 760) unless and until inner packets (740, 750, 760) are broken as described below.

Each inner packet (740, 750, 760) may contain the same chemical or chemicals, or each inner packet (740, 750, 760) may contain different chemicals. For example, inner chamber (725) may contain a chemical (or set of chemicals) known to cause an endothermic reaction when combined with the chemical (or set of chemicals) contained in first inner packet (740), and inner chamber (725) may further contain a chemical (or set of chemicals) known to generate light by chemoluminescence when combined with a chemical (or set of chemicals) contained in second inner packet (750). Alternatively, all of the inner packets (740, 750, 760) may contain the same chemicals. For example, inner chamber (725) may contain a chemical (or set of chemicals) known to cause an endothermic reaction when combined with the chemical (or set of chemicals) contained in inner packets (740, 750, 760), and inner chamber (725) may further contain a chemical (or set of chemicals) known to generate light by chemoluminescence when combined with a chemical (or set of chemicals) further contained in inner packets (740, 750, 760).

Figure 7B:
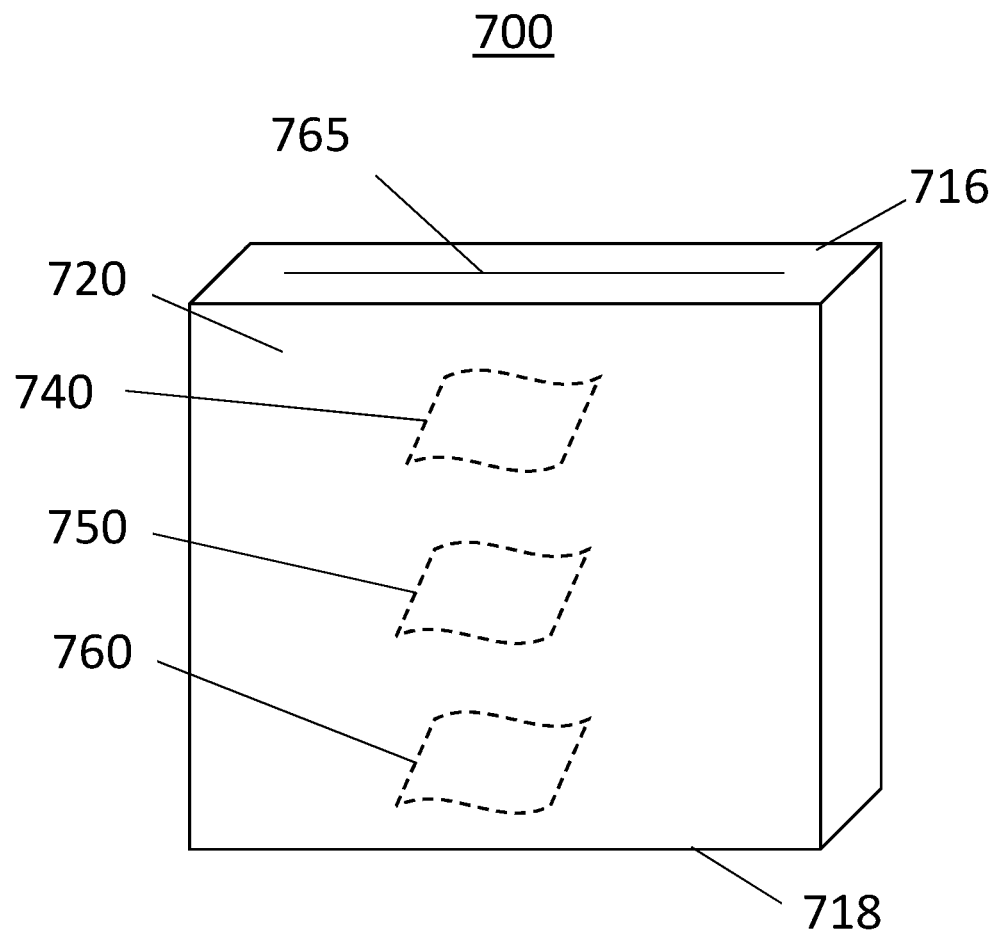
FIG. 7B depicts an alternate view of the device depicted in FIG. 7A.

As shown in FIG. 7B, device (700) may be compressed into a flatter form for storage, transport, or any other purpose, commercial or otherwise. For example, the cylinder maybe compressed so as to close aperture (765).

To activate device (700), a user of the device may squeeze or twist device (700) until one or more of inner packets (740, 750, 760) breaks. The user may shake device (700) to ensure the contents of one or more of the inner packets (740, 750, 760) fully mixes with the contents of inner chamber (725).

Figure 8:
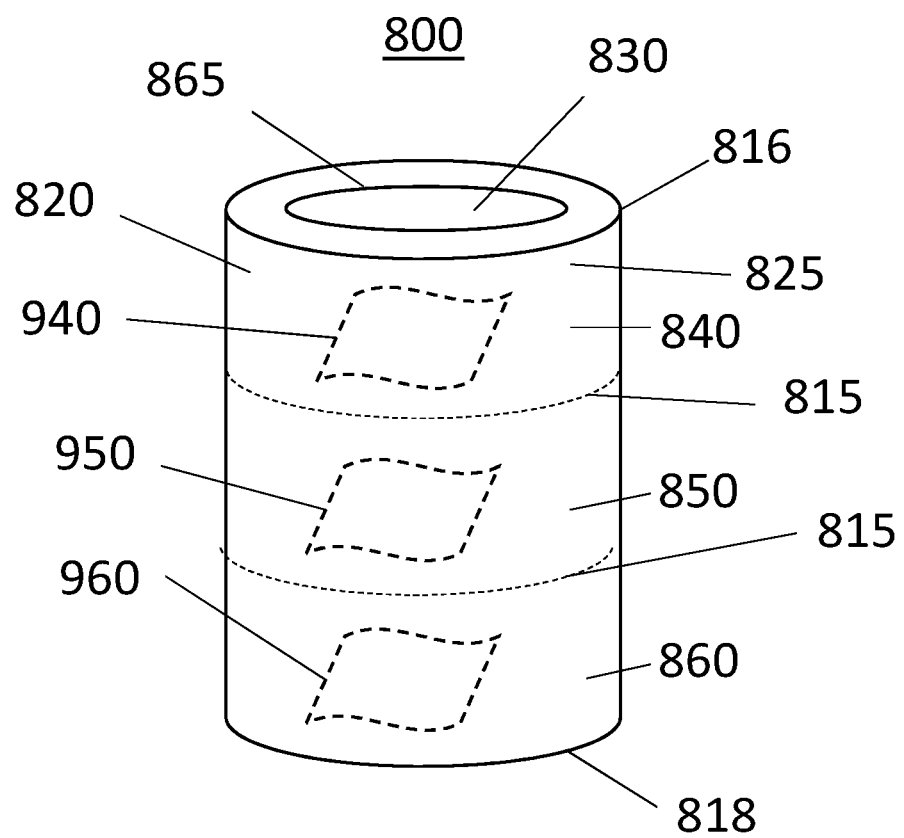
FIG. 8 depicts an exemplary device in accordance with the present of the invention.

FIG. 8 depicts an alternative embodiment of a device (800) in accordance with the present invention. Device (800) is similar to device (700) depicted in FIGS. 7A and 7B, but device (800) includes one or more interior walls or dividers (815) as discussed further below. Device (800) is in the form of a cylinder extending from a top end (816) to a bottom end (818). Device (800) includes a cylindrical outer wall (820), a cylindrical inner wall (830), and a cylindrical inner chamber (825) between outer wall (820) and inner wall (830). Device (800) includes a circular aperture (865) at the top end (816). Device (800) may further include an aperture (not shown) at the bottom end (818). The aperture at the bottom end (818) may be a circular aperture—having a radius that is the same radius as or a different radius than aperture (865)—or an aperture of a different shape. Alternatively, bottom end (818) may be fully enclosed by a floor (not shown).

Outer wall (820) and/or inner wall (830) may be formed from a flexible material such as plastic or neoprene. Outer wall (820) may be made from and/or include one or more layers of insulating material. Additionally or alternatively, at least part of outer wall (820) may be translucent.

One or more interior walls or dividers (815) may separate inner chamber (825) into separate sub-chambers (840, 850, 860). One or more inner packets (940, 950, 960) may be located within each sub-chamber (840, 850, 860). Each inner packet (940, 950, 960) is preferably formed from, for example, plastic.

Each sub-chamber (840, 850, 860) and the one or more inner packets (940, 950, 960) located therein may each contain a chemical (or set of chemicals) that, when combined, are known to cause an endothermic reaction as described above. Additionally or alternatively, each sub-chamber (840, 850, 860) and the one or more inner packets (940, 950, 960) located therein may each contain a chemical (or set of chemicals) that, when combined, are known to generate light by chemoluminescence as described above.

Descriptions herein of chemicals "contained" within sub-chambers (840, 850, 860) are not meant to be read as contained within inner packets (940, 950, 960), even though inner packets (940, 950, 960) are located within sub-chambers (840, 850, 860). Chemicals described as contained within sub-chambers (840, 850, 860) are located outside inner packets (940, 950, 960) unless and until inner packets (940, 950, 960) are broken as described below.

Each inner packet (940, 950, 960) may contain the same chemical or chemicals, or each inner packet (940, 950, 960) may contain different chemicals. For example, sub-chambers (840, 860) may contain a chemical (or set of chemicals) known to cause an endothermic reaction when combined with the chemical (or set of chemicals) contained in inner packets (940, 960), whereas sub-chambers (850) may contain a chemical (or set of chemicals) known to generate light by chemoluminescence when combined with a chemical (or set of chemicals) contained in inner packet (950). Also, each inner packet (940, 950, 960) may contain a dye, and the dyes may be the same color in each packet (940, 950, 960) or different colors.

To activate device (800), a user of the device may squeeze or twist device (800) until one or more of inner packets (940, 950, 960) breaks. The user may shake device (800) to ensure the contents of one or more of the inner packets (940, 950, 960) fully mixes with the contents of each sub-chamber (840, 850, 860).

Figure 9:
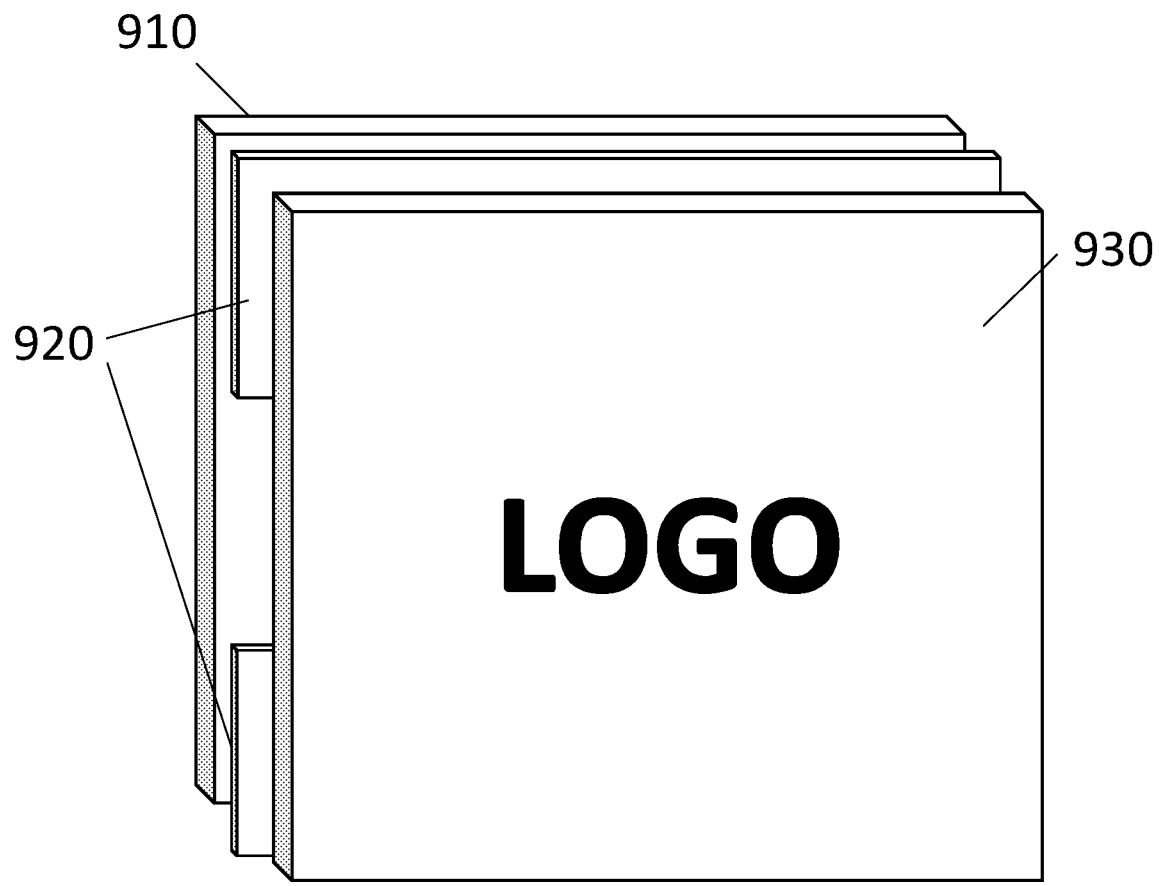
FIG. 9 depicts layers of an outer wall of an exemplary device in accordance with the present of the invention.

Referring to FIG. 9, outer wall of each device described above may include a water proof layer (910), one or more insulating layers (920), and/or one or more layers that are partly translucent and partly opaque (930). For example, the partly translucent and partly opaque layer (930) may include a translucent portion that forms one or more letters and/or symbols, depicting for example a sports team's name and/or mascot. The translucent portion may be a translucent material, such as clear plastic, or may be a cut out from the layer, leaving apertures through which light may pass. The light generated by chemiluminescence as described above may shine through the translucent portion, revealing the one or more letters or symbols. Also, to the extent the one or more insulating layers (920) are not translucent, they may be included only adjacent to the opaque portions of the partly translucent and partly opaque layer (930).

Figure 10:
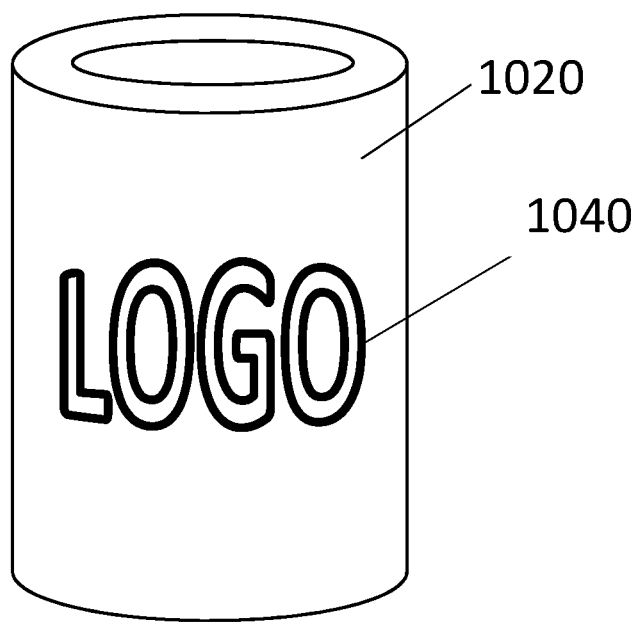
FIG. 10 depicts an exemplary device in accordance with the present of the invention.

FIG. 10 depicts a device (1000) in accordance with the present invention that includes an outer wall (1020) having a translucent portion (1040) through which light may pass.

While the invention has been described in detail with reference to embodiments for the purposes of making a complete disclosure of the invention, such embodiments are merely exemplary and are not intended to be limiting or represent an exhaustive enumeration of all aspects of the invention. It will be apparent to those of ordinary skill in the art that numerous changes may be made in such details, and the invention is capable of being embodied in other forms, without departing from the spirit, essential characteristics, and principles of the invention. Also, the benefits, advantages, solutions to problems, and any elements that may allow or facilitate any benefit, advantage, or solution are not to be construed as critical, required, or essential to the invention. The scope of the invention is to be limited only by the appended claims.

What is claimed is:

1. A portable device comprising:
   an outer packet extending from a first end to a second end and comprising an outer wall and an inner wall, wherein at least part of the outer wall is translucent;
   a first chemical and a second chemical contained in the outer packet;
   a first inner packet located within the outer packet;
   a third chemical and a fourth chemical contained within the first inner packet;
   wherein combining the first chemical and the third chemical causes an endothermic reaction capable of lowering the temperature of the inner wall;
   wherein combining the second chemical and the fourth chemical causes a reaction that generates light by chemiluminescence.

2. The portable device of claim 1, wherein the third chemical is water.

3. The portable device of claim 2, wherein the first chemical is ammonium nitrate.

4. The portable device of claim 2, wherein the first chemical is calcium ammonium nitrate.

5. The portable device of claim 1, wherein the fourth chemical is hydrogen peroxide.

6. The portable device of claim 5, wherein the third chemical is diphenyl oxalate.

7. The portable device of claim 1 further comprising a strip attached to the first end of the outer packet, wherein an adhesive is applied to one side of the strip.

8. The portable device of claim 1 further comprising a strip attached to the first end of the outer packet, wherein hook-and-loop material is applied to the strip.

9. The portable device of claim 7 further comprising a protective liner covering the adhesive.

10. The portable device of claim 1 further comprising a strip of hook-and-loop material at the first end of the outer packet and a complementary strip of hook-and-loop material at the second end of the outer packet.

11. A portable device comprising:
    an outer packet extending from a first end to a second end and comprising an outer wall and an inner wall, wherein at least part of the outer wall is translucent;
    a first chemical and a second chemical located within the outer packet;
    a first inner packet located within the outer packet;
    a third chemical located within the first inner packet;
    a second inner packet located within the outer packet;
    a fourth chemical located within the second inner packet;
    wherein combining the first chemical and the third chemical causes an endothermic reaction capable of lowering the temperature of the outer surface of the inner wall;
    wherein combining the second chemical and the fourth chemical causes a reaction that generates light by chemiluminescence.

12. The portable device of claim 11, wherein the third chemical is water.

13. The portable device of claim 12, wherein the first chemical is ammonium nitrate.

14. The portable device of claim 12, wherein the first chemical is calcium ammonium nitrate.

15. The portable device of claim 11, wherein the fourth chemical is hydrogen peroxide.

16. The portable device of claim 15, wherein the third chemical is diphenyl oxalate.

17. The portable device of claim 11 further comprising a strip attached to the first end of the outer packet, wherein an adhesive is applied to one side of the strip.

18. The portable device of claim 11 further comprising a strip attached to the first end of the outer packet, wherein hook-and-loop material is applied to the strip.

19. The portable device of claim 17 further comprising a protective liner covering the adhesive.

20. The portable device of claim 11 further comprising a strip of hook-and-loop material at the first end of the outer packet and a complementary strip of hook-and-loop material at the second end of the outer packet.

* * * * *